United States Patent
Roard et al.

(10) Patent No.: US 11,449,212 B2
(45) Date of Patent: Sep. 20, 2022

(54) DRAG GESTURE ANIMATION

(71) Applicant: Google LLC, Mountain View, CA (US)

(72) Inventors: Nicolas Roard, San Francisco, CA (US); John Hoford, Mountain View, CA (US)

(73) Assignee: Google LLC, Mountain View, CA (US)

( * ) Notice: Subject to any disclaimer, the term of this patent is extended or adjusted under 35 U.S.C. 154(b) by 324 days.

(21) Appl. No.: 16/405,473

(22) Filed: May 7, 2019

(65) Prior Publication Data

US 2019/0346985 A1   Nov. 14, 2019

Related U.S. Application Data

(60) Provisional application No. 62/668,598, filed on May 8, 2018.

(51) Int. Cl.
  *G06F 3/0486* (2013.01)
  *G06F 3/04842* (2022.01)
  *G06F 3/04817* (2022.01)

(52) U.S. Cl.
  CPC ........ *G06F 3/0486* (2013.01); *G06F 3/04817* (2013.01); *G06F 3/04842* (2013.01)

(58) Field of Classification Search
  CPC ............... G06F 3/0486; G06F 3/04817; G06F 3/04842; G06F 3/04883; G06F 3/04845
  See application file for complete search history.

(56) References Cited

U.S. PATENT DOCUMENTS

| | | |
|---|---|---|
| 6,292,712 B1 | 9/2001 | Bullen |
| 6,356,867 B1 | 3/2002 | Gabai et al. |
| 8,839,150 B2 | 9/2014 | King et al. |
| 2009/0113330 A1* | 4/2009 | Garrison ............... G06F 3/0486 715/769 |
| 2011/0161852 A1* | 6/2011 | Vainio .................. G06F 3/0488 715/810 |
| 2011/0202860 A1* | 8/2011 | Tsai ...................... G06F 3/0488 715/779 |

(Continued)

OTHER PUBLICATIONS

PCT International Search Report and Written Opinion issued in International Application No. PCT/US2019/027843, dated Aug. 26, 2019, 12 pages.

(Continued)

*Primary Examiner* — Kieu D Vu
*Assistant Examiner* — Rami R Okasha
(74) *Attorney, Agent, or Firm* — Shumaker & Sieffert, P.A.

(57) ABSTRACT

Methods, systems, and apparatus, including computer programs encoded on a computer storage medium, for animating a drag gesture are disclosed. In one aspect, a method includes the actions of receiving a user input that drags a user interface element along a user-induced path across a display. The actions further include moving the user interface element along the user-induced path across the display. The actions further include determining that the user input has ceased. The actions further include determining an additional path and a speed for the user interface element to move along the additional path based on the user-induced path and a speed of the user input. The actions further include moving the user interface element along the additional path to a resting location at the determined speed for the user interface element to move along the additional path.

16 Claims, 4 Drawing Sheets

(56) References Cited

U.S. PATENT DOCUMENTS

| | | | |
|---|---|---|---|
| 2012/0054671 A1 | 3/2012 | Thompson et al. | |
| 2012/0306891 A1* | 12/2012 | Shaffer | G06T 13/00 |
| | | | 345/473 |
| 2013/0083037 A1* | 4/2013 | Rodgers | G06F 3/0481 |
| | | | 345/474 |
| 2013/0176316 A1 | 7/2013 | Bates et al. | |
| 2014/0068477 A1* | 3/2014 | Roh | G06F 3/04886 |
| | | | 715/765 |
| 2014/0111441 A1 | 4/2014 | Powell | |
| 2015/0029231 A1* | 1/2015 | Liu | G06F 3/04883 |
| | | | 345/681 |
| 2015/0046812 A1* | 2/2015 | Darby | H04L 65/60 |
| | | | 715/716 |
| 2015/0046831 A1 | 2/2015 | Liang et al. | |
| 2017/0068410 A1* | 3/2017 | Alonso Ruiz | G06F 3/0487 |
| 2017/0102858 A1* | 4/2017 | Sachter-Zeltzer | |
| | | | G06F 3/04845 |
| 2017/0168651 A1* | 6/2017 | Ikeda | G06F 3/04815 |
| 2017/0371515 A1 | 12/2017 | Fiet et al. | |
| 2018/0300036 A1* | 10/2018 | Bhatt | G06F 3/0486 |

OTHER PUBLICATIONS

Response to the communication pursuant to Rules 161(1) and 162 EPC dated Oct. 23, 2020 from counterpart European Application No. 19720353.2, filed Apr. 13, 2021, 35 pp.

International Preliminary Report on Patentability from International Application No. PCT/US2019/027843, dated Apr. 17, 2019, 7 pp.

\* cited by examiner

DRAG GESTURE ANIMATION

CROSS-REFERENCE TO RELATED APPLICATION

This application claims the benefit of U.S. Application No. 62/668,598, filed May 8, 2018, the contents of which are incorporated by reference.

TECHNICAL FIELD

This specification relates to graphical interfaces.

BACKGROUND

A graphical user interface is a type of user interface that allows users to interact with electronic devices through graphical icons and visual indicators, instead of exclusively text-based outputs, typed command labels, or text navigation.

SUMMARY

A user that is interacting with a touch screen may flick an object across the screen using the user's finger. The object may follow the path of the user's finger while the user is touching the screen. Once the user has released his finger from the screen, the device may complete the movement of the object by moving the object at a predetermined speed to a final resting position. If the speed of the user's finger and the predetermined speed do not match, then the movement of the object by the device and the user's movement of the object may appear disconnected and unnatural.

To give device-controlled movement of an object a smooth and natural feel, a device may monitor the speed and trajectory of the user-induced movement of the object. The device may calculate a speed of the object when the user releases the user's finger from the screen. The device may use this final user-induced speed of the object to select the speed of the object for its movement to its resting position. The device may select characteristics for movement of the object that comply with several constraints such as a maximum acceleration for the object, a maximum speed for the object, and a maximum amount of time for the device to move the object to the resting position.

The path of the object as the device moves the object to its resting location may be a cubic spline that includes the location of the object when the user released the user's finger from the screen and the resting location of the object. The other points on the cubic spline may be specific to the type of object being moved. In some instances, the path may be a straight line between the location of the object when the user released the user's finger from the screen and the resting location.

The speed of the object as the device moves the object to the resting location may correspond to a cubic-bezier function. The initial device-controlled speed of the object may be the final user-induced speed, and the final device-controlled speed may be zero. The device may select a cubic-bezier function that complies with the maximum acceleration for the object, a maximum speed for the object, and a maximum amount of time for the device to move the object to the resting position. The device then moves the object along the selected path at the selected speed.

According to an innovative aspect of the subject matter described in this application, a method for animating a drag gesture includes the actions of receiving, by a computing device that includes a display, a user input that drags a user interface element along a user-induced path across the display; moving, by the computing device, the user interface element along the user-induced path across the display; determining, by the computing device, that the user input has ceased; in response to determining that the user input has ceased, determining an additional path and a speed for the user interface element to move along the additional path based on: (i) the user-induced path, and (ii) a speed of the user input; and moving, by the computing device, the user interface element along the additional path to a resting location at the determined speed for the user interface element to move along the additional path.

These and other implementations can each optionally include one or more of the following features. The actions further include determining a location of the user interface element when the user input ceased. The action of determining an additional path and a speed for the user interface element to move along the additional path is based on the location of the user interface element when the user input ceased. The action of determining an additional path and a speed for the user interface element to move along the additional path includes selecting the additional path and the speed from a group of predetermined paths and speeds. The actions further include determining a user interface element type of the user interface element. The action of determining an additional path and a speed for the user interface element to move along the additional path is based on the user interface element type of the user interface element.

The actions further include receiving, by the computing device, an additional user input that drags an additional user interface element along the user-induced path across the display; moving, by the computing device, the additional user interface element along the user-induced path across the display; determining, by the computing device, that the additional user input has ceased; determining that the additional user interface element is a different user interface element type; in response to determining that the additional user input has ceased, determining the additional path and a different speed for the user interface to move along the additional path element based on: (i) the user-induced path, (ii) a speed of the additional user input, and (iii) the additional user interface element being the different user interface element type; and moving, by the computing device, the additional user interface element along the additional path to the resting location at the different speed for the user interface element to move along the additional path. The action of determining an additional path and a speed for the user interface element to move along the additional path includes determining the resting location based on the user-induced path and a speed of the user input. The actions further include determining that a distance of the user-induced path does not satisfy a threshold distance; and based on determining that the distance of the user-induced path does not satisfy a threshold distance, determining that the resting location is an original location of the user interface element.

The actions further include determining that a distance of the user-induced path satisfies a threshold distance; and based on determining that the distance of the user-induced path satisfies a threshold distance, determining that the resting location is a location other than an original location of the user interface element. The action of determining an additional path and an additional speed for the user interface element to move along the additional path is further based on a maximum acceleration for the user interface element, a maximum speed of the user interface element, and a maximum time to move the user interface element along the additional path to the resting location. The additional path corresponds to a cubic spline that includes the resting location and a location of the user interface element when the user input ceased. The speed corresponds to a cubic-bezier easing function. The actions further include determining the speed of the user input at a time that the user input has ceased. The user-induced path is along a path that is fixed by the computing device.

According to another innovative aspect of the subject matter described in this application, a method for animating a drag gesture includes the actions of displaying, by a computing device, a user interface element in a first position on a graphical user interface of the computing device; in response to receiving, by the computing device, a user input beginning at the first position and moving on a first trajectory, moving the user interface element along the first trajectory; and in response to a termination of the user input at a second position: determining, by the computing device, an initial velocity of the user interface element at the second position; determining, by the computing device, a second trajectory for the user interface element beginning at the second position and based at least in part on the determined initial velocity of the user interface element; and moving, by the computing device, the user interface element along the second trajectory.

These and other implementations can each optionally include one or more of the following features. The second trajectory is based at least in part on one or more predetermined parameters. The predetermined parameters include one or more of, a maximum velocity of the user interface element, a maximum rate of acceleration for the user interface element, and a maximum time for the second trajectory. The actions further include determining a third position on the graphical user interface and terminating the second trajectory at the third position. The action of determining the second trajectory includes determining a distance to the third position, calculating a rate of deceleration required to reduce the initial velocity to zero within the determined distance, and if the calculated rate of deceleration is greater than or equal to the maximum rate of acceleration, applying a deceleration at the calculated rate to the user interface element. The action of determining the second trajectory further includes, if the calculated rate of deceleration is less than the maximum rate of acceleration: calculating a peak velocity, such that an initial acceleration at the maximum rate of acceleration from the initial velocity to the peak velocity, followed by a deceleration at the maximum rate of acceleration from the peak velocity to zero, will reach zero at the third position; and if the peak velocity is less than or equal to the maximum velocity, applying the initial acceleration at the maximum rate of acceleration from the initial velocity to the peak velocity, and applying the deceleration at the maximum rate of acceleration from the peak velocity to zero.

The action of determining the second trajectory includes, if the peak velocity is greater than the maximum velocity, applying the initial acceleration at the maximum rate of acceleration from the initial velocity to the maximum velocity, maintaining the maximum velocity for an intermediate distance, and applying the deceleration at the maximum rate of acceleration from the peak velocity to zero. The intermediate distance is calculated such that the deceleration at the maximum rate of acceleration from the peak velocity to zero, will reach zero at the third position. The action of determining the second trajectory includes, if the initial velocity is in a direction away from the third position, applying a first deceleration at the maximum rate of acceleration from the initial velocity to zero, before applying the initial acceleration from zero. If a distance between the first position and the second position is below a threshold distance, the third position is determined to be located at the first position. Moving the user interface element along the first trajectory includes: calculating an anchor point based on the location of the user input; and moving one or more points of the user interface element along respective cubic splines, based on the anchor point, using a cubic-bezier easing function.

Other implementations of this aspect include corresponding systems, apparatus, and computer programs recorded on computer storage devices, each configured to perform the operations of the methods.

The subject matter described in this application may have one or more of the following advantages. A computing device may move an object to a resting location in a controlled and smooth manner. A developer creating animations for different objects moved by the device may be able to create smooth animations by specifying a maximum acceleration and speed for a device-controlled object and a maximum time for device-controlled movement of the object. With those constraints, the device can determine a cubic-bezier function for the speed of the object that moves the object to the resting location in a controlled manner.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
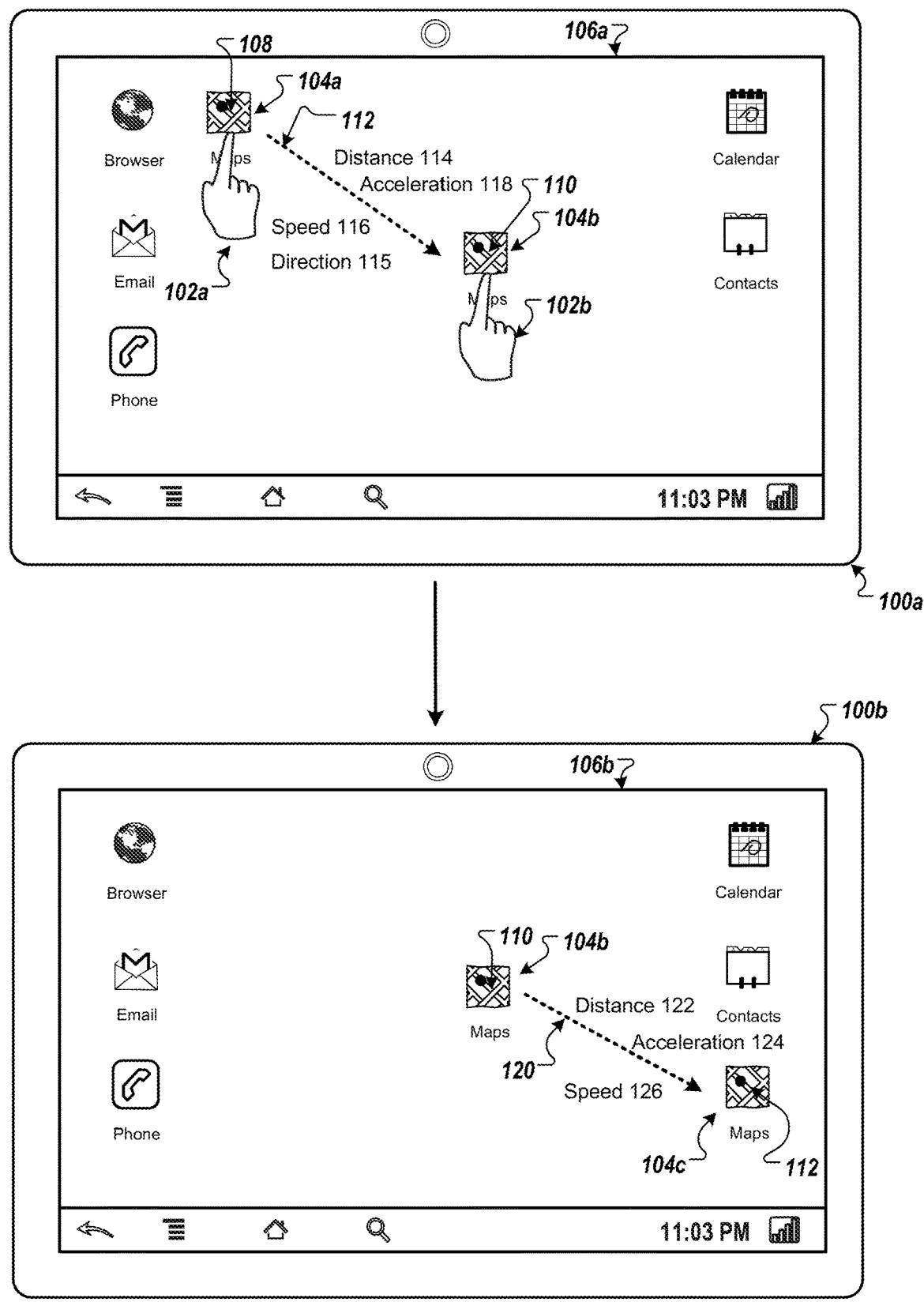
FIG. 1 illustrates example interfaces for animating and completing a drag gesture.

FIG. 1 illustrates example interfaces for animating and completing a drag gesture. Briefly, and as described in more detail below, a user is interacting with a computing device 100 that includes a touch screen 106. The user moves the icon 104 with the user's hand 102 from location 108 to location 110. The computing device 100 may restrict icons to the edges of the touch screen 106. In this instance, the computing device may move the icon 104 from location 110 to location 112 in a smooth and controlled manner that matches the movement of the user's hand 102. Some of the numbers in FIG. 1 may include letters (e.g., a, b, c, etc.) and may represent different instances of the same object at different times. For example, 100a and 100b both represent the same computing device, which may be referred to computing device 100, computing device 100a, or computing device 100b. As another example, finger 102a and finger 102b may represent the same finger at different points in time.

The computing device 100 may be a phone, tablet, smart watch, laptop computer, desktop computer, or any other type of computing device with a display. The user may interact with the computing device through a touch screen 106, a mouse, a stylus, or any other type of pointing device. In the example shown in FIG. 1, the user is interacting with computing device 100 by touching the touch screen 106. The computing device 100 may display several icons on the touch screen 106. For example, the computing device 100 may include a browser icon, an email icon, a phone icon, a calendar icon, a contacts, and a map icon 104. The icons displayed on the touch screen 106 form part of a graphical user interface displayed by the computing device 100. The icons are examples of user interface elements. The user may select an icon to open the respective application. The computing device 100 may limit the placement of the icons to a perimeter of the touch screen 106 so that the interior of the touch screen 106 remains open for the user to view open applications.

The maps icon 104*a* may be located at location 108 on the touch screen 106. Location 108 may be referred to as a first position of the maps icon 104*a*. The user may wish to move the maps icon 104*a* from location 108 to location 112. The user may touch the touch screen 106*a* at location 108 using finger 102*a* to initiate movement of the maps icon 104*a*. The user may drag the finger 102*a* along path 112 and release the finger 102*b* from the screen at location 110. Location 110 may be referred to as a second position of the maps icon 104*a*. While the user is dragging the finger 102 along the path 112, the computing device 100*a* may respond by moving the maps icon 104*a* along the path 112 as the user moves the finger 102. The motion of the finger 102*a* along the path 112 may referred to as a first trajectory.

The computing device 100*a* may calculate the speed 116 of the finger movement along the path 112, a distance 114 of the path 112, a direction 115 of the path 112, and an acceleration 118 of the finger movement along the path 112. The computing device 100 may determine that location 112 is the resting position for the maps icon 104*b* based on the speed 116, the distance 114, the direction 115, and the acceleration 118. For example, because the computing device 100*a* may limit the placement of the icons to a perimeter of the touch screen 106*a*, the computing device 100*a* may determine that the direction 115 is towards location 112 and that the distance 114 is greater than a threshold distance to initiate movement from location 108 to location 112. Location 112 may be referred to as a third position of the maps icon 104*a*. As another example, the computing device 100*a* may compare the distance 114 to a lower threshold distance in instances where the speed 116 is greater. A greater speed 116 may indicate a greater likelihood that the user intends to move the maps icon 104*a* from location 108 to location 112, thus the computing device 100*a* may compare the distance 114 to a lower threshold distance.

The computing device 100*b* may use one or more of the speed 116, the distance 114, the acceleration 118, and the direction 115 to generate the path 120 for the maps icon 104*b*. Based on one or more of the speed 116, the distance 114, the acceleration 118, and the direction 115, the computing device 100*b* may generate the speed 126 and the acceleration 124. The generated motion for the maps icon 104*b* along the path 120 may be referred to as a second trajectory. The computing device 100*b* may calculate the speed 126 and acceleration 124 to comply with one or more time, speed, and acceleration restrictions. For example, the computing device 100*b* may set a limit of two hundred milliseconds for the map icon 104*b* to move from location 110 to location 112. The computing device 100*b* may also set a limit for speed 126 and the acceleration 124. The computing device 100*b* calculates the speed 126 and acceleration 124 that meets the time, speed, and acceleration limits. In some implementations, the time, acceleration, and speed limits may be set by a developer of the respective application program and each type of graphical element that the user can manipulate may have a different time and speed limit.

In some implementations, the computing device 100*b* may select from predetermined speeds and accelerations when calculating the speed 126 and acceleration 124. For example, the computing device 100*b* may have six predetermined speeds and accelerations and each may be ranked according to a preference that may be set by a developer. The computing device 100*b* may apply the distance 122 of the path 120 and the time limit to the first speed and acceleration of the predetermined speeds and accelerations. If the first speed and acceleration is able to meet the time limit, then the computing device 100*b* may select the first speed and acceleration as the speed 126 and acceleration 124 for the path 120. If the first speed and acceleration does not meet the time limit, then the computing device 100*b* may compare additional speeds and accelerations until identifying one that meets the time limit.

In some implementations, the speed 116 of the icon 104*b* at the point when the user removes the finger 102*b* from the display 106*a* may also be a factor to determine the speed and acceleration for the path 120. For example, the computing device 100*b* may determine the speed of the maps icon 104*b* at location 110 to be the initial speed 126. If the speed of the maps icon 104*b* at location 110 is within the speed limit, then the computing device 100*b* may calculate an acceleration to meet the time limit for the maps icon 104*b* to stop at location 112. In some implementations, the computing device 100*b* may apply the speed 116 of the maps icon 104*b* at the location 110 to the predetermined speeds and accelerations. The computing device 100*b* may identify a speed and acceleration that meets the time limit where the speed is the closest to the speed 116 of the maps icon 104*b* at the location 110.

In some implementations, the computing device 100*b* may move the maps icon without jerk, or with a constant acceleration. In this instance, the computing device 100*b* may calculate an acceleration 124 based on the distance 122 and the speed 116 of the maps icon 104*b* at the location 110. The acceleration 124 may be such that the speed of the maps icon 104*c* is zero at location 112. In such cases, where a value of the acceleration 124 is negative, the acceleration 124 may be referred to equally as a deceleration or a negative acceleration.

In some implementations, different types of graphical elements may have different speed and acceleration limits. For example, larger icons may have lower acceleration limits than smaller icons to give the user the impression that the larger icons are more difficult to move. Smaller icons may appear lighter and have higher acceleration limits. The maps icon 104 may have higher acceleration and speed limits than a pull down menu.

In the example above, the maps icon 104 may be located in different places around the display 106. The maps icon 104 may be located at location 108, location 112, or another location around the perimeter of the display 106. Other user interface elements may be limited to two locations. For example, a pull down menu may be limited to two locations. The first location may be closed and off the display 106. The second location may be open. The user may open the pull down menu by swiping the user's finger 102 up or down from the edge of the display 106.

The user drags the menu open from the edge of the display 106. The computing device 100 calculates the distance that the user's finger 102 has moved across the display 106 and the speed that the user's finger 102 is traveling at the point when the user removes the user's finger 102 from the display 106.

The computing device 100 determines whether to open the menu based on the user's movement. The computing device 100 calculates a distance threshold based on the speed of the user's finger 102. If the distance of the user's finger 102 passes the distance threshold, then the computing device 100 opens the pull down menu. A higher speed may correspond to a lower distance threshold. If the user's finger is moving at ten centimeters per second, then the distance threshold may be two centimeters. If the user's finger is moving at three centimeters per second, then the distance threshold may be four centimeters. In some implementations, the distance threshold may be a percentage of the total distance that the pull down menu uses to open. For example, the distance threshold may be fifty percent of the full open distance if the user's finger is moving at three centimeters per second or twenty percent of the full open distance if the user's finger is moving at ten centimeters per second.

If the distance of the user's movement is greater than the distance threshold, then the computing device 102 opens the menu. The computing device 102 accesses the motion parameters for the pull down menu. The parameters may include a maximum time for the computing device 102 to complete the menu opening and a maximum acceleration for the pull down menu. The computing device 102 may select from several different movements to complete the menu opening. The movements may be ranked such that the computing device 102 selects the highest ranked movement that satisfies the maximum time and maximum acceleration parameters. Each predetermined movement may include different segments. An initial segment may be a deceleration segment, followed by a constant speed segment, followed by another deceleration segment. The initial segment may be an acceleration segment in instances where the maximum time constraint may require that the computing device 102 increase the speed of the menu from the final speed at the point when the user removed the user's finger.

In some implementations, the computing device 102 may calculate the speed of the menu for completion of the menu opening by applying the motion parameters to the calculated speed and remaining distance. The computing device 102 may calculate an acceleration of the menu given (i) the speed of the user's finger, which is also the speed of the menu, when the user removed the user's finger from the display 106, (ii) the remaining distance for the menu to open, and (iii) the requirement that the speed of the menu be zero when the menu reaches the open point. If the calculated acceleration is less than the maximum acceleration, then the computing device 102 decelerates the menu from the speed of the menu when the user removed the user's finger to zero while opening the menu. This calculation, where the acceleration is constant, may be useful in instances where the developers wish to minimize jerk.

If the distance of the user's movement is less than the distance threshold, then the computing device 102 closes the menu. The movement of the closing of the menu may be similar to that of opening the menu. The computing device 102 may calculate the speed of the menu at the point when the user removes the user's finger and the distance that the user moved the menu. The computing device 102 may use those two parameters and apply them to acceleration and time constraints for the menu. The computing device 102 may select a predetermined motion curve based on the speed of the menu, the distance traveled, the maximum acceleration, and the maximum time. In some implementations, the computing device 102 may continue to move the menu in the opening direction to decelerate the menu to a stop before returning the menu to the close position. This action may provide the appearance of a smooth closing in instances in which the menu may be moving quickly when the user removes the user's finger.

In some implementations, the user may use a double click or double tap to open an application. For example, the user may double tap the maps icon 104 to open the maps application. In some implementations, the user may move the maps icon 104 in two dimensions. In some implementations, the computing device 102 may restrict the resting location of the maps icon 104 and other user interface elements to locations on a fixed grid. In some implementations, more than one icon or user interface element may not occupy the same location on the display 106 or in the fixed grid. In instances where a user gestures for an icon to occupy the same location as another icon, the computing device 102 may use various criteria to find a different resting location for the icon.

Figure 2:
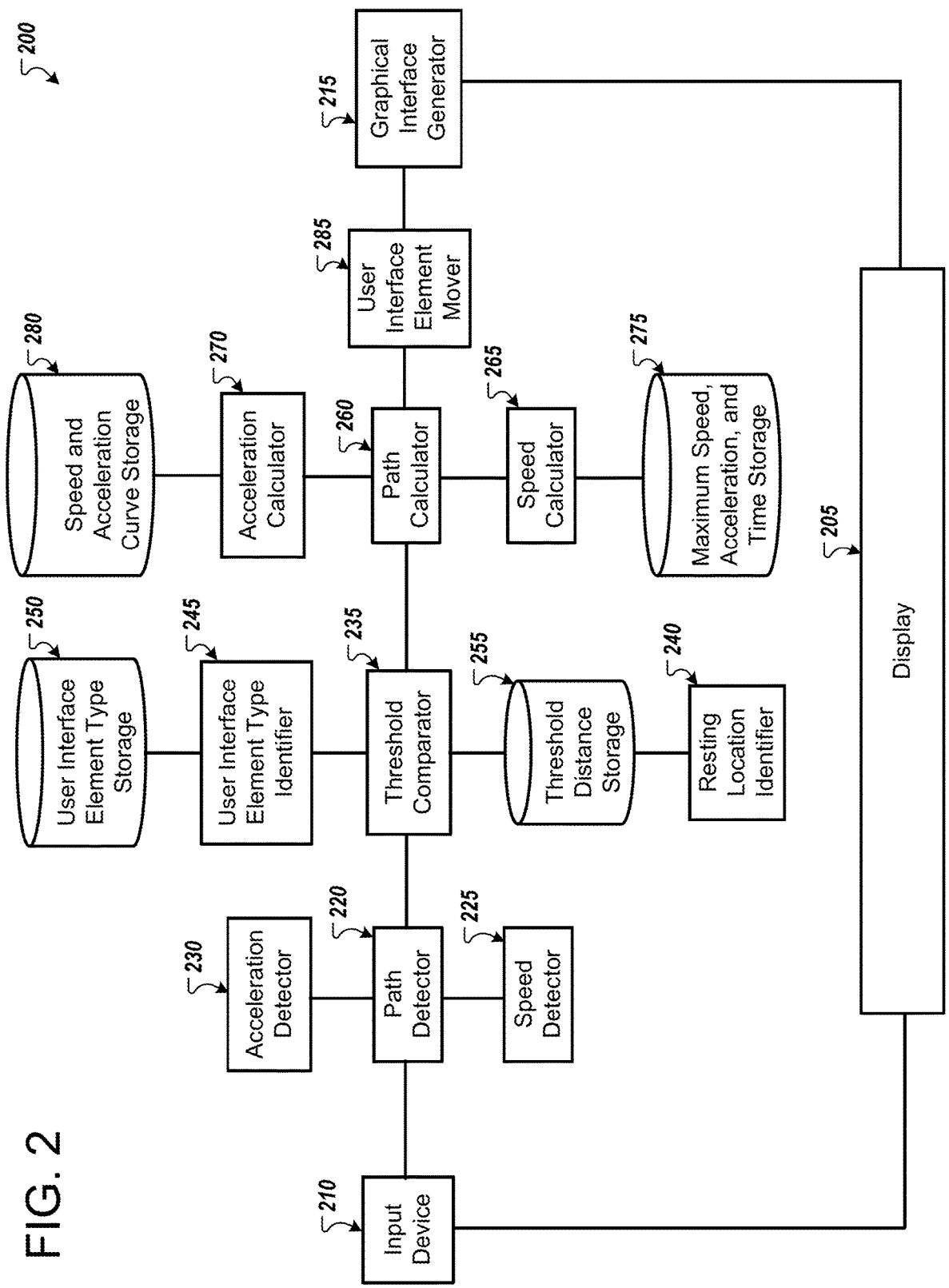
FIG. 2 illustrates an example system for animating and completing a drag gesture.

FIG. 2 illustrates an example system 200 for animating and completing a drag gesture. Briefly, and as described in more detail below, the system 200 detects a user moving a user interface element across a display 205 of the system 200. The user, through the user's movement of the user interface element, may move the user interface element towards a resting location without moving the user interface element all the way to the resting location. The system 200 completes the movement of the user interface element to the resting location in a controlled and smooth manner that is an extension of the user's movement.

The system 200 includes a display 205 that communicates with an input device 210 and a graphical interface generator. The graphical interface generator 215 may generate a graphical user interface for display on the display 205. The graphical interface generator 215 may generate various user interface elements to provide to the display 205. The user may interact with the user interface elements through the input device 210. The user interface element may be an icon, a menu, a window, or any other type of object that is moveable by the user. The input device may be a touch screen, a mouse, a stylus, or any other type of similar input device.

The system 200 includes path detector 220 that is configured to detect the path along which a user moves a user interface element. Some user interface element may have paths that the system 200 restricts. For example, the system 200 may restrict the path of a pull down menu. The system 200 may restrict the menu to only traveling up and down on the display 205 in a path that is parallel to the edges of the display 205. Other user interface elements such as icons may not have restricted paths. For example, the user may be able to move an icon around the display 205 along a circular path. In some examples, a user interface element may exactly track determined movement of user input before release, and in other examples a user input may substantially track determined movement of user input before release.

The system 200 includes a speed detector 225 that is configured to detect the speed of the user interface element as the user moves the user interface element around the display 205. In some implementations, the system 200 may restrict the speed at which the user can move a user interface element. For example, the system 200 may limit the speed of a larger user interface element to provide the illusion that the larger user interface element is "heavier." In this instance, the system 200 may not limit the speed of smaller user interface elements or provide a higher maximum speed for smaller user interface elements. In some implementations, the system 200 may not limit the speed at which the user can move any of the user interface elements.

The system includes an acceleration detector 230 that is configured to detect the acceleration of the user interface element as the user moves the user interface element around the display 205. In some implementations, the system 200 may restrict the acceleration at which the user can change the speed of the user interface element. For example, the system 200 may limit the acceleration of a larger user interface element to provide the illusion that the larger user interface element is "heavier." In this instance, the system 200 may not limit the acceleration of smaller user interface elements or provide a higher maximum speed for smaller user interface elements. In some implementations, the system 200 may not limit the acceleration at which the user can change the speed of any of the user interface elements.

The path detector 220 is also configured to detect the point at which the user input stops. In some implementations, the stopping of the user input may be a trigger for the path detector 220 to provide data identifying the detected path, the detected speed, and the detected acceleration to the next stage of the system 300.

The next stage of the system 200 includes a threshold comparator 235 that is configured to determine whether the system 200 should move the user interface element back to the original location before the user interacted with the user interface element or whether the system 200 should move the user interface element to a new resting location. The threshold comparator 235 communicates with the resting location identifier 240 and the user interface element type identifier 245 to determine where to move the user interface element.

The user interface element type identifier 245 compares the user interface element to the user interface element type storage 250 and identifies the type of user interface element that the user manipulated. The resting location identifier 240 may identify the resting location for the user interface element based on the user element interface type. For example, a pull down menu may have one resting location. The resting location may be the menu in the shown position. The original location of the pull down menu may be hidden. As another example, an icon may have multiple possible resting locations and an original location where the icon was located before the user interacted with the icon.

In some implementations, the resting location identifier 240 may use the identified path, speed, and acceleration to identify a resting location. The resting location identifier may extrapolate the path based on the speed at the point when the user input stopped and the direction of the path. For example, the user may be moving a user interface element towards a corner of the display 205 at ten centimeters per second. Based on that speed, the resting location identifier 240 may determine that the resting location for the user interface element is the corner of the display 205. As another example, the user may be moving the user interface element towards the corner of the display 205 at one centimeter per second. Based on that speed, the resting location identifier 240 may determine that the resting location for the user interface element is one centimeter further along the path extrapolated from the user's path. As another example, the user may be moving the user interface element towards a corner of the display 205 at one centimeter per second. The length of the user-induced path is five millimeters. Based on these parameters, the resting location identifier 240 may determine that the resting location of the user interface element is the original location of the user interface element before the user moved the user interface element.

The threshold comparator 235 determines whether the user has moved the user interface element past a threshold distance such that the system 200 should move the user interface element to the resting location instead of back to the original location. The threshold comparator 235 may use the original location of the user interface element, the identified resting location of the user interface element, the distance of the user-induced path, and the distance remaining to resting location. The threshold comparator 235 may access threshold distances stored in the threshold distance storage 255. If the threshold comparator 235 determines that the length of the user-induced path is greater than the threshold distance, then the system 200 moves the user interface element to the resting location. If the threshold comparator 235 determines that the length of the user-induced path is less than the threshold distance, then the system 200 moves the user interface element back to the resting location.

In some implementations, the threshold comparator 235 may adjust the threshold distance based on the speed of the user interface element. For example, the threshold distance may be one centimeter if the user-induced speed of the user interface element is ten centimeters per second. The threshold distance may be five centimeters if the user-induced speed of the user interface element is one centimeter per second.

In some implementations, the threshold distance may be a ratio based on the distance between the original location and the resting location. For example, the threshold distance may be half of the distance between the resting location and the original location. If the distance of the user-induced path is less than half the distance between the resting location and the original location, then the system 200 moves the user interface element back to the original location. If the distance of the user-induced path is greater than half the distance between the resting location and the original location, then the system 200 moves the user interface element to the resting location.

The system 200 advances to the next stage to determine the path that the system will move the user interface element. The next stage includes a path calculator 260, a speed calculator 265, and an acceleration calculator 270. The path calculator 260 is configured to calculate a path for the system 200 to move the user interface element. The speed calculator 265 is configured to calculate the speed of the user interface element as the system 200 moves the user interface element along the calculated path. The acceleration calculator 270 is configured to calculate the acceleration of the user interface element as the system 200 moves the user interface element along the calculated path.

The path calculator 260 calculates a path for the system 200 to move the user interface element. In instances where the system 200 moves the user interface element to the new resting location, the calculated path is the shortest distance between the resting location and the location of the user interface element when the user input stopped. In instances where the system 200 moves the user interface element to the original location, the calculated path is the shortest distance between the between the original location and the location of the user interface element when the user input stopped. In some implementations, the path may curve to move the user interface element around other graphical objects on the display 205.

The speed calculator 265 and the acceleration calculator 270 calculate the speed and acceleration of the user interface element for movement along the calculated path based on the speed of the user interface element at the point when the user input ceased, the remaining distance to the resting location, and constraints for the movement stored in the maximum speed, acceleration, and time storage 275. In some implementations, the speed calculator 265 and the acceleration calculator 270 apply a maximum amount of time for the system 200 to move the user interface element to the resting location and a maximum acceleration. For example, the speed calculator 265 and the acceleration calculator 270 may calculate a constant acceleration for the user interface element along the calculated path. The initial speed along the calculated path may be the speed of the user interface element at the point when the user input ceased and the final speed may be zero at the resting location. The acceleration may be constant as long as the time that the system 200 moves the user interface element is less than the maximum time constraint. In some implementations, the constraints may also include a maximum speed. The constraints may be defined by one or more predetermined parameters, corresponding to one or more of the maximum acceleration, maximum time and maximum speed.

In some implementations, the speed calculator 265 and the acceleration calculator 270 may select from predetermined speed and acceleration curves. The predetermined speed and acceleration curves may be stored in the speed and acceleration curve storage 280. The speed calculator 265 and the acceleration calculator 270 may apply the final user-induced speed of the user interface element, the maximum time constraint, and the maximum acceleration constraint to the predetermined speed and acceleration curves. The predetermined speed and acceleration curves may be ranked such that if a higher ranked curve meets the constraints, then the system 200 will select that higher ranked curve. The speed calculator 265 and the acceleration calculator 270 may apply the final user-induced speed of the user interface element, the maximum time constraint, and the maximum acceleration constraint to the highest ranked curve. If the highest ranked curve does not fit the constraints, then the speed calculator 265 and the acceleration calculator 270 apply the constraints to the next highest ranked curve until finding a predetermined curve that fits the constraints. In some implementations, there are six predetermined speed and acceleration curves.

Each predetermined curve may include one or more different segments. Each segment may selected from an acceleration segment, a constant speed segment, and a deceleration segment. A first ranked curve may include, for example, an acceleration segment, a constant speed segment, and a deceleration segment. The acceleration segment may include an acceleration at the maximum acceleration from the final user-induced speed to the maximum speed. The constant speed segment may maintain the speed at the maximum speed. The deceleration segment may include a negative acceleration at the maximum acceleration from the maximum speed to zero. The first ranked curve may be selected if the first ranked curve meets the constraints for e.g. maximum time and if the remaining distance to the resting location is sufficient to complete the curve.

A second ranked curve may include, for example, a constant speed segment and a deceleration segment only. The second ranked curve may be selected if the first ranked curve does not meet the constraints. For example, if the final user-induced speed is equal to the maximum speed and the first ranked curve would cause the speed to exceed the maximum speed, the second ranked curve may be selected. The constant speed segment may maintain the speed at the maximum speed. The deceleration segment may include a negative acceleration at the maximum acceleration from the maximum speed to zero. The second ranked curve may be selected if the second ranked curve meets the constraints for e.g. maximum time and if the remaining distance to the resting location is sufficient to complete the curve If the first and second ranked curves do not meet the constraints, a third ranked curve may be selected. For example, if the time required by the first ranked curve or the second ranked curve exceeds the maximum time, the third ranked curve may be selected. The third ranked curve may include, for example, an acceleration segment and a deceleration segment only. The acceleration segment may include an acceleration at the maximum acceleration from the final user-induced speed to a peak speed. The deceleration segment may include a negative acceleration at the maximum acceleration from the peak speed to zero. The peak speed is less than or equal to the maximum speed. The third ranked curve may be selected if the third ranked curve meets the constraints for e.g. maximum time and if the remaining distance to the resting location is sufficient to complete the curve.

If the first, second and third ranked curves do not meet the constraints, a fourth ranked curve may be selected. For example, if the time required by the first ranked curve, second ranked curve or the third ranked curve exceeds the maximum time, the fourth ranked curve may be selected. The fourth ranked curve may include, for example, a deceleration segment only. The deceleration segment may include a negative acceleration at the maximum acceleration from the peak speed to zero. The fourth ranked curve may be selected if the third ranked curve meets the constraints for e.g. maximum time and if the remaining distance to the resting location is sufficient to complete the curve. In some embodiments, the deceleration segment may include a negative acceleration from the peak speed to zero at a rate of acceleration higher than the maximum acceleration, in order to meet one or both of the maximum time constraint and the remaining distance to the resting location.

If the final user-induced speed is in a direction away from the resting location, the fifth or the sixth ranked curves maybe selected. The first and sixth ranked curves may include an additional initial deceleration segment. The initial deceleration segment may include a negative acceleration at the maximum acceleration from the final user-induced velocity to zero. Following the initial deceleration to zero, the fifth and sixth ranked curves include an acceleration towards the resting location. The fifth and sixth ranked curves, correspond respectively to the first and third ranked curves, with an additional initial deceleration segment.

In some implementations, the constraints such as maximum time to travel along the path and the maximum acceleration may be different for each type of user interface element. For example, a pull down menu may have a maximum time to travel along the path of eight hundred milliseconds, a maximum acceleration of one centimeter per second squared, and a maximum speed of five centimeters per second. An icon may have a maximum time to travel along the path of five hundred milliseconds, a maximum acceleration of two centimeter per second squared, and a maximum speed of seven centimeters per second.

In some implementations, the predetermined speed and acceleration curves may be different for each type of user interface element. For example, a pull down menu may have six predetermined speed and acceleration curves. An icon may have six different predetermined speed and acceleration curves, at least some of which may or may not overlap the predetermined speed and acceleration curves of the pull down menu.

The user interface element mover 285 moves the user interface element along the path identified by the path calculator 260 at the speed and acceleration identified by the speed and acceleration calculators 265 and 270. The user interface element mover 285 moves the user interface element and provides movement data to the graphical interface generator 215 for presentation on the display 205.

Figure 3:
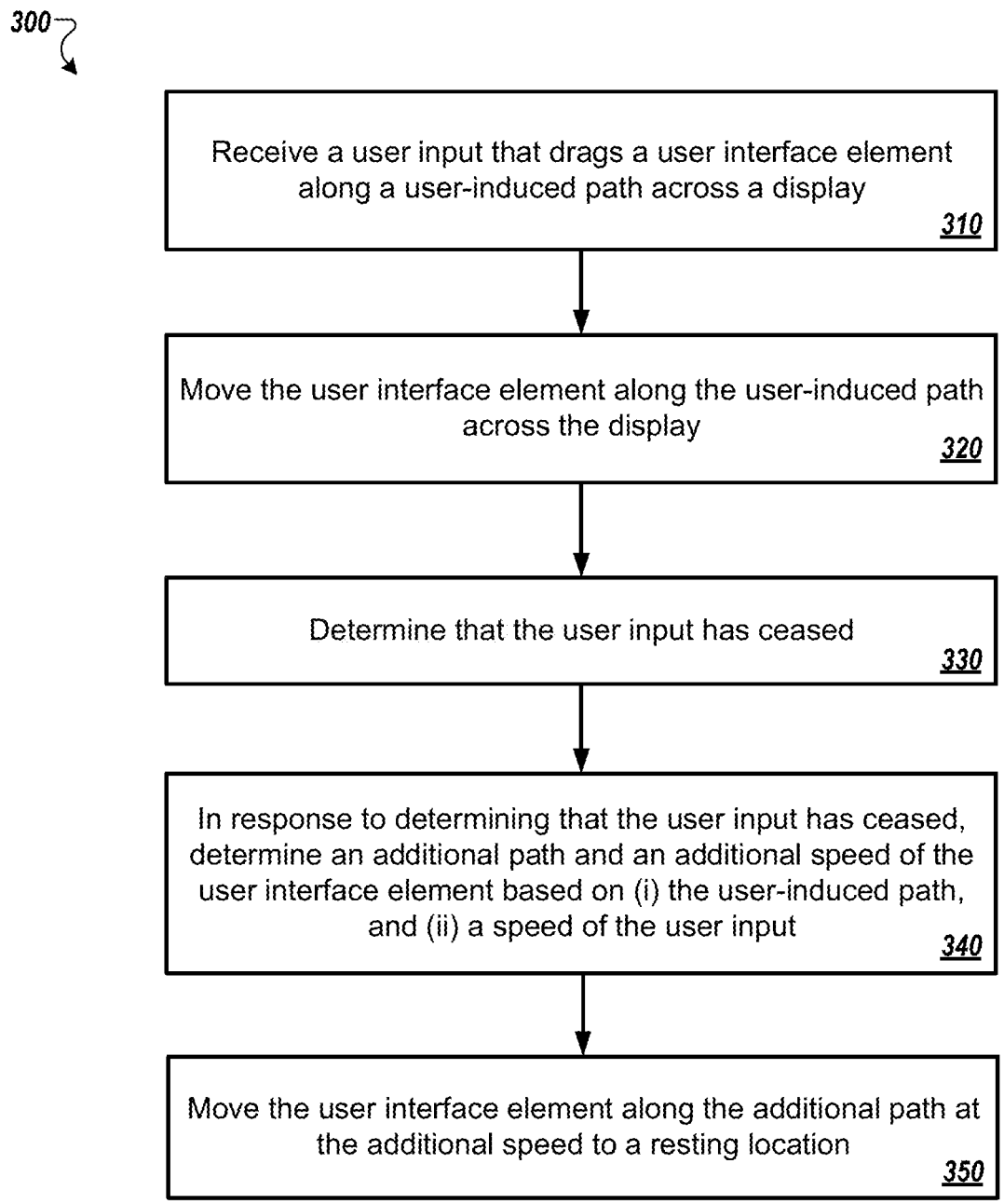
FIG. 3 illustrates an example process for animating and completing a drag gesture.

FIG. 3 illustrates an example process 300 for animating and completing a drag gesture. In general, the process 300 receives a user input that moves a user interface element across a display. The process 300 completes the movement of the user interface element to a resting location in a smooth and controlled manner. The process 300 will be described as being performed by a computer system comprising one or more computers, for example, the system 100 as shown in FIG. 1 or the system 200 as shown in FIG. 2.

The system receives a user input that drags a user interface element along a user-induced path across the display (310). For example, a user may drag a pull down menu from the top of the display using the user's finger. In some implementations, the user-induced path is defined by the system as is the case when the user pulls down a menu. In some implementations, the user-induces path is a freeform path defined by the user as is the case when a user moves an icon across the screen. The system moves the user interface element along the user-induced path across the display (320). For example, in response to the user input, the system moves the pull down menu to follow the user input drag.

The system determines that the user input has ceased (330). For example, the user removes the user's finger from the display. In some implementations, the system determines the location of the user interface element when the user input ceases. For example, the pull down menu may be two centimeters from the top of the display. In some implementations, the system determines a length of the user-induced path. For example, the system determines that the user moved the pull down menu two centimeters.

The system, in response to determining that the user input has ceased, determines an additional path and an additional speed of the user interface element based on (i) the user-induced path, and (ii) a speed of the user input (340). In some implementations, the system compares the length of the user-induced input to a distance threshold. If the length of the user-induced input satisfies the distance threshold, then the system moves the user interface element to a different location than the user interface element was originally located. For example, if the user moves the pull down menu two centimeters and the distance threshold is one centimeter, then the system opens the pull down menu. If the length of the user-induced input does not satisfy the distance threshold, then the system returns the user interface element to an original location of the user interface element before the user interacted with the user interface element. For example, if the user moves the pull down menu two centimeters and the distance threshold is three centimeters, then the system closes the pull down menu.

In some implementations, the system determines whether to move the user interface element to the original location or a location other than the original location based on the speed of the user interface element at the point where the user stopped interacting with the user interface element and based on the distance that the user moved the user interface element. For example, if the user stopped moving the user interface element after two centimeters at which point the user was moving the user interface element at a speed of one centimeter per second, then the system may return the user interface element to the original location. If the user stopped moving the user interface element at a speed of three centimeters per second, then the system may move the user interface element to a location other than the original location.

In some implementations, the system determines the additional path and the additional speed of the user interface element based on the location of the user interface element when the user input ceased. For example, the system may begin moving the pull down menu at the location where the pull down menu was located when the user removed the user's finger.

In some implementations, the system determines the additional path and the additional speed of the user interface element from a group of predetermined paths and speeds. For example, a developer may provide the system with six different predetermined speed curves for the system to use when selecting a predetermined speed curve for the path. In some implementations, the system may select from different predetermined speed curves depending on the type of user interface element. For example, the system may select from six speed curves for pull down menus and select from six different speed curves for icons. In some implementations, the predetermined paths and speed curves move along a cubic spline at a speed that is based on a cubic-bezier easing function. Each type of user interface element may have a different cubic spline that may be based on the location of the user interface element when the user input stopped. Additionally, each type of user interface element may move at a speed of a different cubic-bezier easing functions. In some implementations, each of the predetermined paths and speeds may correspond to different cubic splines and different cubic-bezier easing functions. In some implementations, the predetermined paths may include additional paths that are arcs.

In some implementations, the predefined paths and speed curves may be adaptable depending on the system type. For example, the predefined paths and speed curves may be defined for a system with a nine inch diagonal display. For a system that has a five inch diagonal display, the system may reduce the size of the predetermined paths by a ratio of five to nine. For a system that has a fifteen inch diagonal display, the system may increase the size of the predetermined paths by a ratio of fifteen to nine. In either of these examples, the speed curves may be adjusted using similar ratios or the speed curves may not be adjusted. In some implementations, the system may use pixel measurements instead of distance measurements.

In some implementations, the predetermined paths and speed curves may be adaptable depending on a window size of a window in which the user is moving the user interface element. For example, the predefined paths and speed curves may be defined for a window of ten centimeters by eight centimeters. For a window of twenty centimeters by twenty centimeters, the system may increase the size of the predetermined paths by a ratio of one to two or three to five. For a window of six centimeters by six centimeters, the system may decrease the size of the predetermined paths by a ratio of five to three or four to three. In either of these examples, the speed curves may be adjusted using similar ratios or the speed curves may not be adjusted. In some implementations, the ratios may be based on areas or perimeters of the windows. In some implementations, the system may use pixel measurements instead of distance or area measurements.

In some implementations, the system selects a speed curve that complies with constraints for time and acceleration. For example, the system selects a speed curve that causes the user interface element to begin at the speed at which the user input stopped, to reach the resting location within the time constraint, and to maintain an acceleration that is below a maximum. A developer may set the maximum acceleration and the time constraint. The predetermined speed curves may be ranked. The system may select the highest ranked speed curve that satisfies the constraints. In some implementations, the acceleration of the additional speed curve is constant. In some implementations, the additional speed and the acceleration of the additional speed are not constant. For example, the speed may increase in a first portion of the speed curve, then be constant in a second portion of the speed curve, then decrease to zero in a third portion of the speed curve.

In some implementations, the system determines the speed of the user input at the point when the user input ceases. For example, the user flicks the user interface element across the display. At the point when the user releases the user's finger from the display, the system determines the instantaneous speed of the user input. In some implementations, the speed of the user input may be based on a maximum speed of the user input, a median speed of the user input, an arithmetic mean of the user input, a geometric mean of the user input, or a minimum speed of the user input.

The system moves the user interface element along the additional path at the additional speed to a resting location (350). In some implementations, the user may move an additional user interface element along the same path. In instances where the additional user interface element is a different type or the user moves the additional user interface element at a different speed, then the system may select a different speed for the additional user interface element. The additional user interface element may have different constraints if the additional user interface element is a different type. The speed of the additional user interface element when controlled by the system may be different because the speed of the additional user interface element when the user input stopped may be different. In some implementations, when the user interface element reaches the resting location, the system may add a post-effect. For example, the system may add a physically-based bounce depending on the user input velocity where the user interface element bounces more for higher user-induced speeds.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 4:
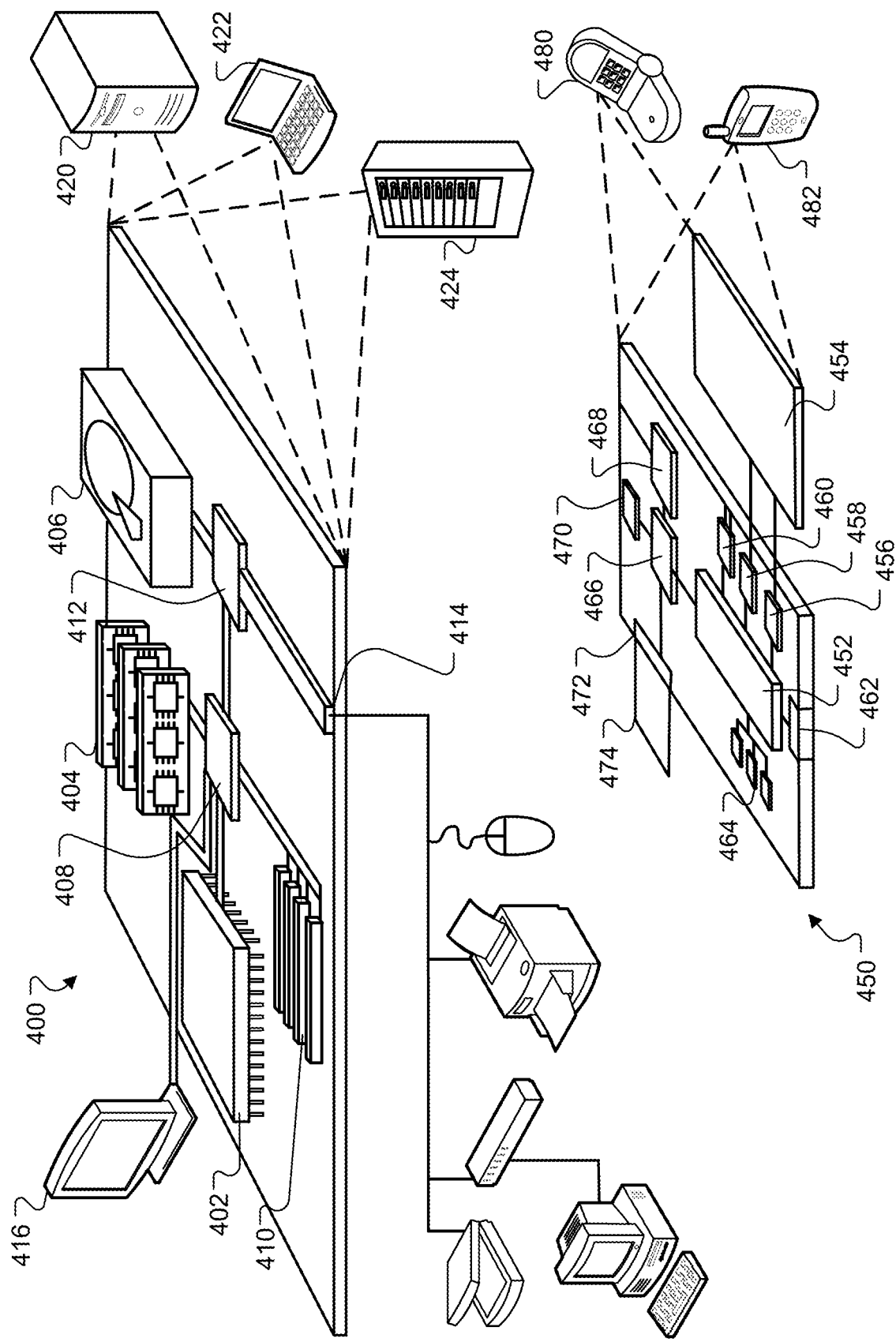
FIG. 4 illustrates an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver. In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

The invention claimed is:

1. A computer-implemented method comprising:
   receiving, by a computing device that includes a display, a user input that drags a user interface element along a user-induced path across the display;
   moving, by the computing device, the user interface element along the user-induced path across the display;
   determining, by the computing device, that the user input has ceased;
   in response to determining that the user input has ceased:
     ranking, by the computing device, a group of predetermined speed and acceleration curves based at least in part on a maximum acceleration for the user interface element, a maximum speed of the user interface element, and a maximum time to move the user interface element along an additional path to a resting location;
     selecting, by the computing device, from the group of predetermined speed and acceleration curves, and based at least in part on the ranking, the additional path and a speed for the user interface element to move long the additional path to the resting location; and
     determining the resting location based at least in part on:
       (i) the user-induced path,
       (ii) the additional path,
       (iii) a type of the user interface element,
       (iv) one or more candidate resting locations associated with the type of the user interface element; and
   moving, by the computing device, the user interface element along the additional path to the resting location at the speed for the user interface element to move along the additional path.

2. The method of claim 1, comprising:
   determining a location of the user interface element when the user input ceased,
   wherein determining the resting location and the speed for the user interface element to move along the additional path is further based on the location of the user interface element when the user input ceased.

3. The method of claim 1, further comprising:
   receiving, by the computing device, an additional user input that drags an additional user interface element along the user-induced path across the display;
   moving, by the computing device, the additional user interface element along the user-induced path across the display;
   determining, by the computing device, that the additional user input has ceased;
   determining that the additional user interface element is a different user interface element type;
   in response to determining that the additional user input has ceased, determining the additional path and a different speed for the user interface to move along the additional path element based on:
     (i) the user-induced path,
     (ii) a speed of the additional user input, and
     (iii) the additional user interface element being the different user interface element type; and
   moving, by the computing device, the additional user interface element along the additional path to the resting location at the different speed for the user interface element to move along the additional path.

4. The method of claim 1, comprising:
determining that a distance of the user-induced path does not satisfy a threshold distance; and
responsive to determining that the distance of the user-induced path does not satisfy a threshold distance, determining that the resting location is an original location of the user interface element.

5. The method of claim 1, comprising:
determining that a distance of the user-induced path satisfies a threshold distance; and
responsive to determining that the distance of the user-induced path satisfies a threshold distance, determining that the resting location is a location other than an original location of the user interface element.

6. The method of claim 1, wherein:
the additional path corresponds to a cubic spline that includes the resting location and a location of the user interface element when the user input ceased, and
the speed corresponds to a cubic-bezier easing function.

7. The method of claim 1, comprising:
determining the speed of the user input at a time that the user input has ceased.

8. The method of claim 1, wherein the user-induced path is along a path that is fixed by the computing device.

9. The method of claim 1, wherein the type of the user interface element is one of a pull-down menu or an icon.

10. A computer implemented method comprising:
displaying, by a computing device, a user interface element in a first position on a graphical user interface of the computing device;
in response to receiving, by the computing device, a user input beginning at the first position and moving on a first trajectory, moving the user interface element along the first trajectory; and
in response to a termination of the user input at a second position:
ranking, by the computing device, a group of predetermined speed and acceleration curves based at least in part on a maximum acceleration for the user interface element, a maximum velocity of the user interface element, and a maximum time to move the user interface element along a second trajectory to a resting location;
selecting, by the computing device, from the group of predetermined speed and acceleration curves, and based at least in part on the ranking, the second trajectory and a speed for the user interface element to move long the second trajectory to the resting location;
determining, by the computing device, the resting location of the user interface element based at least in part on one or more candidate resting locations associated with a type of the user interface element and the second trajectory; and
moving, by the computing device, the user interface element along the second trajectory.

11. The method of claim 10, further comprising:
determining a distance to the resting location;
determining, by the computing device, an initial velocity of the user interface element at the second position;
calculating a rate of deceleration required to reduce the initial velocity to zero within the determined distance, and
if the calculated rate of deceleration is greater than or equal to the maximum rate of acceleration, applying a deceleration at the calculated rate to the user interface element.

12. The method of claim 11, further comprising:
in response to determining that the calculated rate of deceleration is less than the maximum rate of acceleration:
calculating a peak velocity, such that an initial acceleration at the maximum rate of acceleration from the initial velocity to the peak velocity, followed by a deceleration at the maximum rate of acceleration from the peak velocity to zero, will reach zero at the resting location; and
if the peak velocity is less than or equal to the maximum velocity, applying the initial acceleration at the maximum rate of acceleration from the initial velocity to the peak velocity, and applying the deceleration at the maximum rate of acceleration from the peak velocity to zero.

13. The method of claim 12, further comprising:
in response to determining that the peak velocity is greater than the maximum velocity, applying the initial acceleration at the maximum rate of acceleration from the initial velocity to the maximum velocity, maintaining the maximum velocity for an intermediate distance, and applying the deceleration at the maximum rate of acceleration from the peak velocity to zero;
wherein the intermediate distance is calculated such that the deceleration at the maximum rate of acceleration from the peak velocity to zero, will reach zero at the resting location.

14. The method of claim 12, further comprising:
in response to determining that the initial velocity is in a direction away from the resting location, applying a first deceleration at the maximum rate of acceleration from the initial velocity to zero, before applying the initial acceleration from zero.

15. The method of claim 10 wherein, if a distance between the first position and the second position is below a threshold distance, the resting location is determined to be located at the first position.

16. The method of claim 10, wherein moving the user interface element along the first trajectory comprises:
calculating an anchor point based on a location of the user input; and
moving one or more points of the user interface element along respective cubic splines, based on the anchor point, using a cubic-bezier easing function.

* * * * *